(12) United States Patent
Ma et al.

(10) Patent No.: US 11,632,077 B2
(45) Date of Patent: Apr. 18, 2023

(54) FAULT POINT POSITION DETERMINING METHOD AND APPARATUS AND PHOTOVOLTAIC SYSTEM

(71) Applicant: Huawei Digital Power Technologies Co., Ltd., Shenzhen (CN)

(72) Inventors: Xun Ma, Dongguan (CN); Guilei Gu, Shanghai (CN); Wei Shui, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/088,023

(22) Filed: Nov. 3, 2020

(65) Prior Publication Data

US 2021/0050816 A1   Feb. 18, 2021

Related U.S. Application Data

(63) Continuation of application No. PCT/CN2019/108771, filed on Sep. 27, 2019.

(30) Foreign Application Priority Data

Mar. 1, 2019 (CN) .......................... 201910157197.2

(51) Int. Cl.
*H02S 50/10* (2014.01)
*H02S 40/32* (2014.01)

(52) U.S. Cl.
CPC .............. *H02S 50/10* (2014.12); *H02S 40/32* (2014.12)

(58) Field of Classification Search
CPC ......... H02S 50/10; H02S 40/32; Y02E 10/50; G01R 31/50; G01R 31/52; G01R 31/54
See application file for complete search history.

(56) References Cited

U.S. PATENT DOCUMENTS 8,878,563 B2 * 11/2014 Robbins ............ H01L 31/02021
                                                      324/761.01
9,897,642 B1    2/2018 Johnson
(Continued)

FOREIGN PATENT DOCUMENTS

CN    103217612 A    7/2013
CN    104362976 A    2/2015
(Continued)

OTHER PUBLICATIONS

Gu Chenjie et al.,"Fault Location Method for Photovoltaic Power Plant Based on Negative-sequence Voltage Ordering",Guangdong Electric Power,vol. 31, No. 9,Aug. 2018,with an English abstract-,total 8 pages.

*Primary Examiner* — Lee E Rodak
*Assistant Examiner* — Sangkyung Lee
(74) *Attorney, Agent, or Firm* — Womble Bond Dickinson (US) LLP (57) ABSTRACT

Embodiments of this application disclose a fault point position determining method and apparatus and a photovoltaic system, to correctly and efficiently determine a fault point position when a disconnection fault occurs in a photovoltaic system. The method is applied to a photovoltaic system, the photovoltaic system includes at least one inverter and at least one photovoltaic unit, each photovoltaic unit includes at least one photovoltaic module and one photovoltaic module controller, and the method includes: sending, by an inverter, a first test signal to the at least one photovoltaic unit; obtaining, by the inverter, first test signal characteristic information fed back by the at least one photovoltaic unit; and performing, by the inverter, absolute value or relative value sorting on the at least one piece of first test signal characteristic information, and determining a (Continued)

fault point in the photovoltaic system based on a sorting result.

19 Claims, 5 Drawing Sheets

(56) References Cited

U.S. PATENT DOCUMENTS

| | | | | |
|---|---|---|---|---|
| 9,995,796 | B1* | 6/2018 | Johnson | G01R 31/129 |
| 2013/0088252 | A1* | 4/2013 | Brabetz | G01R 31/52 |
| | | | | 324/761.01 |
| 2013/0120017 | A1* | 5/2013 | Hopf | G08B 13/1409 |
| | | | | 324/761.01 |
| 2017/0214362 | A1 | 7/2017 | Basu et al. | |

FOREIGN PATENT DOCUMENTS

| | | |
|---|---|---|
| CN | 104660304 A | 5/2015 |
| CN | 107064713 A | 8/2017 |
| CN | 207053467 U | 2/2018 |
| CN | 108197774 A | 6/2018 |
| CN | 108362981 A | 8/2018 |
| CN | 109905084 A | 6/2019 |
| JP | 2009021341 A | 1/2009 |
| JP | 2015053389 A | 3/2015 |
| JP | 2017187344 A | 10/2017 |
| JP | 2017529518 A | 10/2017 |

* cited by examiner

FAULT POINT POSITION DETERMINING METHOD AND APPARATUS AND PHOTOVOLTAIC SYSTEM

CROSS-REFERENCE TO RELATED APPLICATIONS

This application is a continuation of International Patent Application No. PCT/CN2019/108771, filed on Sep. 27, 2019, which claims priority to Chinese Patent Application No. 201910157197.2, filed on Mar. 1, 2019. The disclosures of the aforementioned applications are hereby incorporated by reference in their entireties.

TECHNICAL FIELD

This application relates to the field of power electronics technologies, and in particular, to a fault point position determining method and apparatus and a photovoltaic system.

BACKGROUND

Usually, a photovoltaic system may include at least one photovoltaic string and at least one inverter. Each photovoltaic string is connected in parallel to an inverter, each photovoltaic string includes at least one photovoltaic unit, and photovoltaic units are connected in series. Each photovoltaic unit may include at least one photovoltaic module and a photovoltaic module controller. The photovoltaic module controller is configured to control an output voltage, an output current, and the like of the photovoltaic unit.

Figure 1:
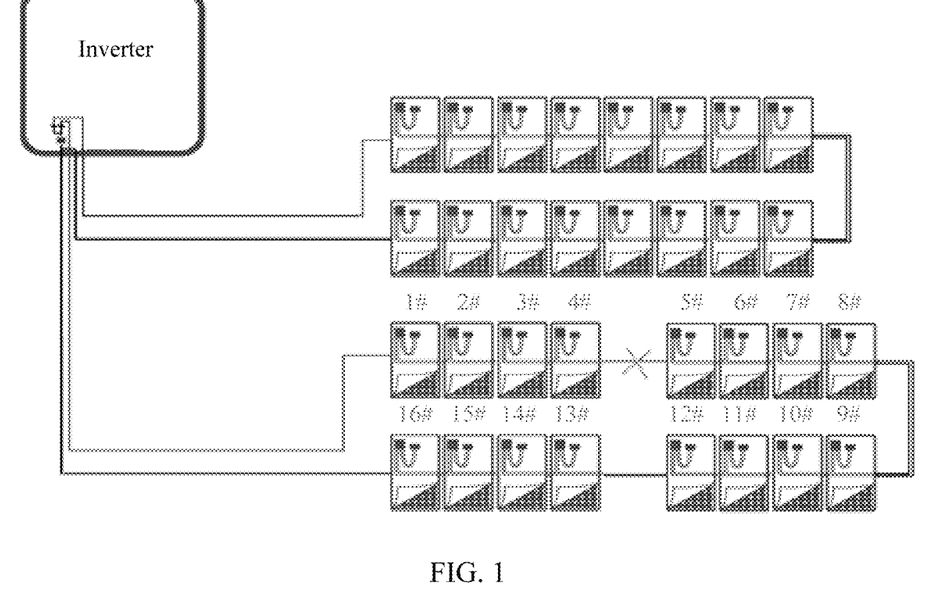
FIG. 1 is a schematic structural diagram of a photovoltaic system according to the prior art.

For example, a structure of a photovoltaic system may be shown in FIG. 1. The photovoltaic system shown in FIG. 1 includes two photovoltaic strings, and each photovoltaic string includes sixteen photovoltaic units. Each photovoltaic unit includes an optimizer, configured to perform DC/DC conversion on a direct current output by a photovoltaic module, to output a direct current whose voltage and current are adjustable, to maximize an output power of the photovoltaic unit.

Usually, an inverter and a photovoltaic unit and adjacent photovoltaic units are both connected by using a terminal. If looseness or poor contact occurs in a terminal, a disconnection fault occurs between two photovoltaic units (to be specific, an electrical connection between the two photovoltaic units is broken). For example, in the photovoltaic system shown in FIG. 1, a disconnection fault occurs between a photovoltaic unit #4 and a photovoltaic unit #5. Consequently, a current loop cannot be formed between a photovoltaic string and an inverter, affecting normal working of the photovoltaic string. In the prior art, a fault point usually needs to be manually checked. A photovoltaic unit is usually laid on a roof and one photovoltaic string includes a relatively large quantity of photovoltaic units, causing heavy workloads in a check, and low efficiency.

Therefore, a solution for determining a fault point position is urgently required, to correctly and efficiently determine a fault point position when a disconnection fault occurs between photovoltaic units.

SUMMARY

Embodiments of this application provide a fault point position determining method and apparatus and a photovoltaic system, to correctly and efficiently determine a fault point position when a disconnection fault occurs in a photovoltaic system.

According to a first aspect, an embodiment of this application provides a fault point position determining method. The method is applied to a photovoltaic system, the photovoltaic system includes at least one inverter and at least one photovoltaic unit, the photovoltaic unit includes at least one photovoltaic module and one photovoltaic module controller, and the method includes the following steps: sending, by the inverter, a first test signal to the at least one photovoltaic unit; obtaining, by the inverter, first test signal characteristic information fed back by the at least one photovoltaic unit; and performing, by the inverter, absolute value or relative value sorting on the at least one piece of first test signal characteristic information, and determining a fault point in the photovoltaic system based on a sorting result.

The photovoltaic module controller may be an optimizer or a shutdown device.

In the method provided in the first aspect, the inverter sends the first test signal to the at least one photovoltaic unit, for the at least one photovoltaic unit to measure the first test signal. When a disconnection fault occurs in the photovoltaic system, the first test signal characteristic information fed back by the at least one photovoltaic unit presents a tendency different from that in a normal working state. Therefore, after obtaining first test signal characteristic information fed back by photovoltaic units, the inverter may determine the fault point in the photovoltaic system based on a result of absolute value or relative value sorting performed on the first test signal characteristic information fed back by the photovoltaic units. According to the method provided in the first aspect, when the disconnection fault occurs in the photovoltaic system, the fault point position can be correctly and efficiently determined without a manual check of the fault point position.

In an embodiment, the first test signal characteristic information includes but is not limited to the following: signal strength information of the first test signal, and impedance information of the first test signal.

In addition, in an embodiment, the first test signal may be a PLC communication signal.

According to the foregoing solution, an original communication protocol between photovoltaic units and an original communication protocol between an inverter and a photovoltaic unit may be used to implement the method provided in the first aspect.

In an embodiment, that the inverter obtains the first test signal characteristic information fed back by the at least one photovoltaic unit may be specifically implemented in the following two manners.

Manner 1

The inverter receives the at least one piece of first test signal characteristic information sent by the at least one photovoltaic unit.

Manner 2

The inverter receives the at least one piece of first test signal characteristic information sent by at least one third photovoltaic unit, and all or some photovoltaic units in the at least one third photovoltaic unit are configured to forward first test signal characteristic information fed back by at least one fourth photovoltaic unit.

According to the foregoing solution, the inverter may directly receive the first test signal characteristic information from the at least one photovoltaic unit, or the third photovoltaic unit may forward first test signal characteristic information fed back by another photovoltaic unit.

In an embodiment, that the inverter determines the fault point in the photovoltaic system based on the sorting result may be implemented in the following manner: the inverter determines that an absolute value or a relative value of first test signal characteristic information fed back by a first photovoltaic unit is the smallest or the largest; and the inverter determines that the fault point in the photovoltaic system is located between the first photovoltaic unit and a second photovoltaic unit, where the second photovoltaic unit is a photovoltaic unit adjacent to the first photovoltaic unit.

In the photovoltaic system, a ground distributed capacitance exists in a photovoltaic panel in the photovoltaic unit, and a ground distributed capacitance also exists between cables. If a disconnection occurs in the photovoltaic system, and a normal signal path is cut off, the first test signal flows back to a reference ground through the ground distributed capacitance in the photovoltaic panel and the ground distributed capacitance between the cables. Because a total ground distributed capacitance of a photovoltaic unit closest to a disconnection point is the smallest, an alternating current impedance of the photovoltaic unit is the largest, and a signal strength is the weakest. According to the foregoing solution, the fault point in the photovoltaic system can be determined based on absolute value or relative value sorting performed on the first test signal characteristic information (for example, alternating current impedance information or signal strength information).

In addition, after the inverter sends the first test signal to the at least one photovoltaic unit, if the inverter obtains no first test signal characteristic information fed back by the photovoltaic unit, the inverter may send a second test signal to the at least one photovoltaic unit, where a frequency of the second test signal is different from a frequency of the first test signal. The inverter obtains second test signal characteristic information fed back by the at least one photovoltaic unit. The inverter performs absolute value or relative value sorting on the at least one piece of second test signal characteristic information, and determines the fault point in the photovoltaic system based on a sorting result.

After the inverter sends the first test signal, if it is difficult for one or more photovoltaic units in the at least one photovoltaic unit to obtain first test signal characteristic information through measurement because of a relatively weak signal strength of the first test signal, or if all pieces of first test signal characteristic information obtained by a plurality of photovoltaic units through measurement are very close, and consequently, it is difficult for the inverter to distinguish between the first test signal characteristic information fed back by the photovoltaic units, the inverter may send a second test signal at another frequency, for the photovoltaic unit to measure a characteristic information of the second test signal. Then, the inverter may determine the fault point in the photovoltaic unit based on absolute value or relative value sorting performed on the second test signal characteristic information.

In the method provided in the first aspect, a plurality of manners can be used to determine that the disconnection fault occurs in the photovoltaic system, and then the fault point position determining method provided in the first aspect may be used to determine the fault point position.

Manner 1

Before the inverter sends the first test signal to the at least one photovoltaic unit, the inverter determines that a current signal and/or a voltage signal of the at least one photovoltaic unit is abnormal.

According to the foregoing solution, that the disconnection fault occurs in the photovoltaic system can be determined based on voltage and current characteristics of the photovoltaic unit.

Manner 2

Before the inverter sends the first test signal to the at least one photovoltaic unit, the inverter determines that an electric arc is generated in the photovoltaic system.

According to the foregoing solution, that the disconnection fault occurs in the photovoltaic system can be determined based on a characteristic of the electric arc in the photovoltaic system.

Manner 3

After the inverter obtains the first test signal characteristic information fed back by the at least one photovoltaic unit, the inverter determines, based on the first test signal characteristic information fed back by the at least one photovoltaic unit, that the disconnection fault occurs in the photovoltaic system.

According to the foregoing solution, after receiving the first test signal characteristic information fed back by the photovoltaic unit, the inverter can determine that the disconnection fault occurs in the photovoltaic system, and then analyze the first test signal characteristic information fed back by the at least one photovoltaic unit, to determine a specific disconnection position.

According to a second aspect, an embodiment of this application provides a fault point position determining method. The method is applied to a photovoltaic system, the photovoltaic system includes at least one inverter and at least one photovoltaic unit, the photovoltaic unit includes at least one photovoltaic module and one photovoltaic module controller, and the method includes: receiving, by the photovoltaic module controller, a first test signal sent by the inverter; measuring, by the photovoltaic module controller, the first test signal, to obtain first test signal characteristic information; and feeding back, by the photovoltaic module controller, the first test signal characteristic information to the inverter.

In addition, the photovoltaic module controller may be further configured to perform another operation performed by the photovoltaic unit in the method provided in the first aspect, and details are not described herein.

According to a third aspect, an embodiment of this application provides a fault point position determining method. The method is applied to a photovoltaic system, the photovoltaic system includes at least one photovoltaic unit, the photovoltaic unit includes at least one photovoltaic module and one photovoltaic module controller, and the method includes:

sending, by a fifth photovoltaic unit in the at least one photovoltaic unit, a first test signal to at least one other photovoltaic unit in the at least one photovoltaic unit than the fifth photovoltaic unit;

obtaining, by the fifth photovoltaic unit, first test signal characteristic information fed back by the at least one other photovoltaic unit; and performing, by the fifth photovoltaic unit, absolute value or relative value sorting on the at least one piece of first test signal characteristic information, and determining a fault point in the photovoltaic system based on a sorting result.

The first test signal characteristic information includes one or more of the following: signal strength information of the first test signal, and impedance information of the first test signal.

According to a fourth aspect, an embodiment of this application provides a fault point position determining method. The method is applied to a photovoltaic system, the photovoltaic system includes at least one photovoltaic unit, the photovoltaic unit includes at least one photovoltaic module and one photovoltaic module controller, and the method includes: receiving, by the photovoltaic module controller, a first test signal sent by a fifth photovoltaic unit in the at least one photovoltaic unit; measuring, by the photovoltaic module controller, the first test signal, to obtain first test signal characteristic information; and feeding back, by the photovoltaic module controller, the first test signal characteristic information to the fifth photovoltaic unit.

According to a fifth aspect, an embodiment of this application provides a fault point position determining apparatus. The apparatus is applied to a photovoltaic system, the photovoltaic system includes at least one fault point position determining apparatus and at least one photovoltaic unit, the photovoltaic unit includes at least one photovoltaic module and one photovoltaic module controller, and the apparatus includes: a sending unit, configured to send a first test signal to the at least one photovoltaic unit; a receiving unit, configured to obtain first test signal characteristic information fed back by the at least one photovoltaic unit; and a processing unit, configured to perform absolute value or relative value sorting on the at least one piece of first test signal characteristic information, and determine a fault point in the photovoltaic system based on a sorting result.

The first test signal characteristic information may include one or more of the following: signal strength information of the first test signal, and impedance information of the first test signal. The photovoltaic module controller may be an optimizer or a shutdown device.

In an embodiment, when determining the fault point in the photovoltaic system based on the sorting result, the processing unit is specifically configured to: determine that an absolute value or a relative value of first test signal characteristic information fed back by a first photovoltaic unit is the smallest; or determine that an absolute value or a relative value of first test signal characteristic information fed back by the first photovoltaic unit is the largest; and determine that the fault point in the photovoltaic system is located between the first photovoltaic unit and a second photovoltaic unit, where the second photovoltaic unit is a photovoltaic unit adjacent to the first photovoltaic unit.

In an embodiment, when obtaining the first test signal characteristic information fed back by the at least one photovoltaic unit, the receiving unit is specifically configured to: receive the at least one piece of first test signal characteristic information sent by the at least one photovoltaic unit; or receive the at least one piece of first test signal characteristic information sent by at least one third photovoltaic unit, where all or some photovoltaic units in the at least one third photovoltaic unit are configured to forward first test signal characteristic information fed back by at least one fourth photovoltaic unit.

In an embodiment, the processing unit is further configured to: after the sending unit sends the first test signal to the at least one photovoltaic unit, determine that no first test signal characteristic information fed back by the at least one photovoltaic unit is obtained; the sending unit is further configured to send a second test signal to the at least one photovoltaic unit, where a frequency of the second test signal is different from a frequency of the first test signal; the receiving unit is further configured to obtain second test signal characteristic information fed back by the at least one photovoltaic unit; and the processing unit is further configured to perform absolute value or relative value sorting on the at least one piece of second test signal characteristic information, and determine the fault point in the photovoltaic system based on a sorting result.

In an embodiment, the processing unit is further configured to: before the sending unit sends the first test signal to the at least one photovoltaic unit, determine that a current signal and/or a voltage signal of the at least one photovoltaic unit is abnormal; or determine that an electric arc is generated in the photovoltaic system.

In an embodiment, the processing unit is further configured to: after the receiving unit obtains the first test signal characteristic information fed back by the at least one photovoltaic unit, determine, based on the first test signal characteristic information fed back by the at least one photovoltaic unit, that a disconnection fault occurs in the photovoltaic system.

In an embodiment, the first test signal may be a PLC communication signal.

According to a sixth aspect, an embodiment of this application provides a fault point position determining apparatus. The apparatus is applied to a photovoltaic system, the photovoltaic system includes at least one inverter and at least one photovoltaic unit, the photovoltaic unit includes at least one photovoltaic module and at least one fault point position determining apparatus, and the apparatus includes: a receiving unit, configured to receive a first test signal sent by the inverter; a processing unit, configured to measure the first test signal, to obtain first test signal characteristic information; and a sending unit, configured to feed back the first test signal characteristic information to the inverter.

According to a seventh aspect, an embodiment of this application provides a fault point position determining apparatus. The fault point position determining apparatus is applied to a photovoltaic system. A structure of the fault point position determining apparatus includes a processor and a memory. The processor is configured to support the apparatus in performing corresponding functions in the method in the first aspect, the method in the second aspect, the method in the third aspect, and the method in the fourth aspect. The memory is coupled to the processor, and stores a program instruction and data necessary for the fault point position determining apparatus. The structure of the fault point position determining apparatus further includes a communications interface, configured to communicate with another device.

According to an eighth aspect, an embodiment of this application provides a photovoltaic system, including at least one inverter and at least one photovoltaic unit, where the photovoltaic unit includes at least one photovoltaic module and one photovoltaic module controller; the inverter is configured to send a first test signal to the at least one photovoltaic unit; the at least one photovoltaic unit is configured to feed back first test signal characteristic information to the inverter; and the inverter is further configured to perform absolute value or relative value sorting on the at least one piece of first test signal characteristic information, and determine a fault point in the photovoltaic system based on a sorting result.

It should be noted that in the photovoltaic system provided in the eighth aspect, the inverter may be further configured to perform the solutions provided in the different design manners in the first aspect, the photovoltaic unit may be further configured to perform the solutions provided in the different design manners in the second aspect, and details are not described herein again.

In addition, for the technical effects brought by any one of the possible design manners in the second aspect to the eighth aspect, refer to the technical effects brought by the different design manners in the first aspect. Details are not described herein again.

DESCRIPTION OF EMBODIMENTS

The following first briefly describes an application scenario of the embodiments of this application.

Figure 2:
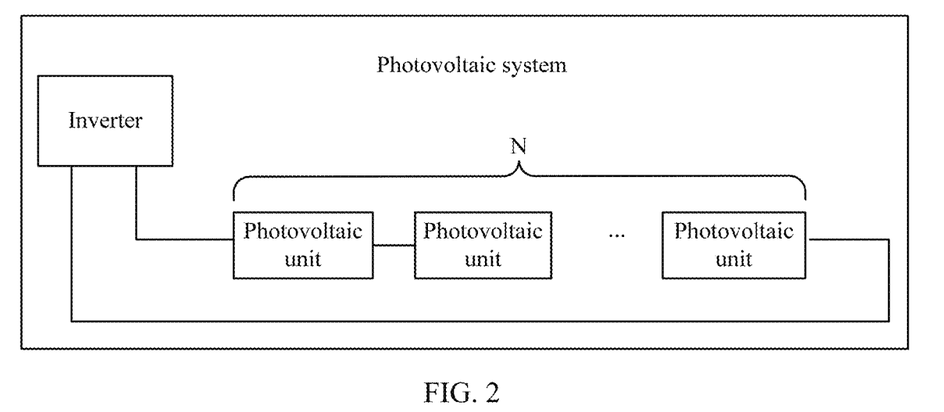
FIG. 2 is a schematic structural diagram of a photovoltaic system according to an embodiment of this application.

The embodiments of this application may be applied to a photovoltaic system shown in FIG. 2. The photovoltaic system includes at least one inverter (indicated by one inverter in FIG. 2) and at least one photovoltaic unit, the at least one photovoltaic unit is connected in series, and each of the at least one photovoltaic unit includes at least one photovoltaic module and one photovoltaic module controller.

An input end of the photovoltaic module controller is connected to the photovoltaic module, and is configured to regulate an output voltage and an output current of the photovoltaic module. In addition, the photovoltaic module controller is further connected to two photovoltaic units adjacent to the photovoltaic unit in which the photovoltaic module controller is located, to connect the photovoltaic units. For example, the photovoltaic module controller may be an optimizer, configured to regulate an output voltage and an output current, to maximize an output power of the photovoltaic unit. Alternatively, the photovoltaic module controller may be a shutdown device, configured to enable or disable an output of the photovoltaic unit.

In an embodiment, in each photovoltaic unit, a direct current output by the photovoltaic module is DC/DC converted by the photovoltaic module controller and then output. A plurality of photovoltaic units all output a direct current to the inverter, and an alternating current obtained after the inverter DC/AC converts the direct current may be used as mains to be output to a power grid.

In an embodiment of this application, the at least one photovoltaic unit connected in series may be considered as one photovoltaic string, which may also be referred to as a direct current high-voltage string. The photovoltaic system may include one photovoltaic string, or may include a plurality of photovoltaic strings. In FIG. 2, only an example in which the photovoltaic system includes only one photovoltaic string is used for illustration. When the photovoltaic system includes a plurality of photovoltaic strings, the plurality of photovoltaic string are connected in parallel.

In addition, in the photovoltaic system shown in FIG. 2, information may be transferred both between an inverter and each photovoltaic unit and between photovoltaic units by using a power line communication (PLC) protocol, to perform information exchange operations such as a service query and command control. The inverter may be used as a PLC communication host, and the photovoltaic module controller may be used as a PLC communication slave.

In the photovoltaic system shown in FIG. 2, both the inverter and a photovoltaic unit are connected and adjacent photovoltaic units are connected by using a terminal. If looseness or poor contact occurs in a terminal, a disconnection fault occurs between two photovoltaic units. In the prior art, a manual check of a fault point position causes heavy workloads and low efficiency in the check, making it difficult to correctly and efficiently determine the fault point position.

The embodiments of this application provide a fault point position determining method and apparatus and a photovoltaic system, to correctly and efficiently determine a fault point position when a disconnection fault occurs in a photovoltaic system. The method and the apparatus are based on a same inventive concept. Because principles of the method and the apparatus for resolving a problem are similar, implementations of the apparatus and the method can refer to each other, and repetitions are not described again.

It should be noted that "a plurality of" in this application means two or more than two. In addition, it should be understood that in descriptions of this application, terms such "first" and "second" are used only to distinguish purposes of the descriptions, and should not be understood as indicating or implying relative importance, nor as indicating or implying a sequence.

To make the objectives, technical solutions, and advantages of this application clearer, the following further describes this application in detail with reference to the accompanying drawings.

Figure 3:
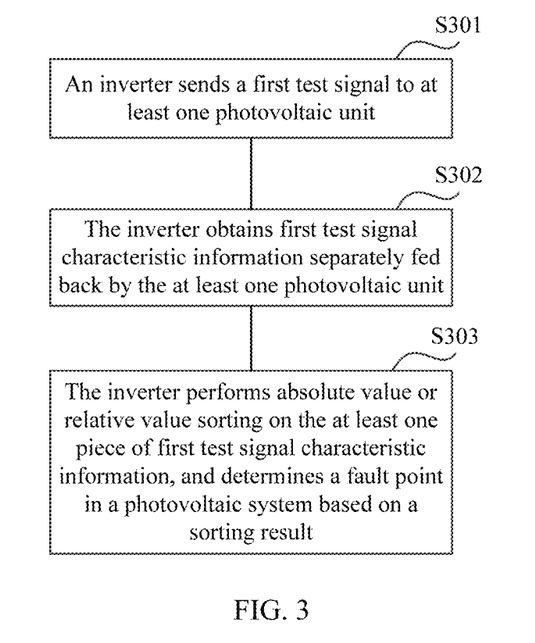
FIG. 3 is a schematic flowchart of a fault point position determining method according to an embodiment of this application.

FIG. 3 is a schematic flowchart of a fault point position determining method according to an embodiment of this application. The method may be applied to the photovoltaic system shown in FIG. 2, the photovoltaic system includes at least one inverter and at least one photovoltaic unit, and each photovoltaic unit includes at least one photovoltaic module and one photovoltaic module controller. The photovoltaic module controller may be an optimizer configured to regulate an output voltage and an output current of the photovoltaic unit, or may be a shutdown device configured to perform an enabling operation or a disabling operation on an output of the photovoltaic unit.

Referring to FIG. 3, the method includes the following operations.

S301: The inverter sends a first test signal to the at least one photovoltaic unit.

The first test signal is used by the at least one photovoltaic unit to measure the first test signal, for example, the photovoltaic unit may measure a signal strength, an impedance, or the like of the first test signal.

In an embodiment of this application, that the inverter sends a first test signal to the at least one photovoltaic unit may mean: After the inverter sends the first test signal, the at least one photovoltaic unit connected in series may all receive the first test signal. After receiving the first test signal, each photovoltaic unit can measure the received first test signal, to obtain first test signal characteristic information and report the first test signal characteristic information to the inverter. Specifically, the photovoltaic module controller in the photovoltaic unit may be used to measure the first test signal. A specific measurement manner belongs to the prior art, and details are not described herein.

In an embodiment, the first test signal may be a direct-current signal, or may be an alternating-current signal. Using an example in which the first test signal is an alternating-current signal, the first test signal may be a PLC communication signal. The first test signal may be a signal in a PLC communication frequency band, or a signal outside the PLC communication frequency band, when PLC communication is performed between the inverter and the photovoltaic unit.

For example, in the photovoltaic system, when PLC communication is performed between photovoltaic units or between an inverter and a photovoltaic unit, a signal in a frequency band of 75 kHz to 148.5 kHz is usually used. In this case, a frequency of the first test signal may fall between 75 kHz and 148.5 kHz, or may be a frequency falling outside a range of the frequency band, for example, may be 150 kHz.

In an embodiment, when the inverter sends the first test signal, the inverter may continuously send a test signal/test signals (PLC communication signals) of one or more pre-defined frequencies in a time period, and a PLC module in the photovoltaic module controller of each photovoltaic unit may measure a received first test signal.

S302: The inverter obtains the first test signal characteristic information fed back by the at least one photovoltaic unit.

The first test signal characteristic information includes but is not limited to signal strength information of the first test signal, and impedance information of the first test signal.

In an embodiment, the inverter may perform S302 of obtaining the first test signal characteristic information fed back by the at least one photovoltaic unit in a plurality of manners, and two manners thereof are listed below.

Manner 1

In the manner 1, the inverter may receive the at least one piece of first test signal characteristic information sent by the at least one photovoltaic unit.

That is, in the manner 1, each photovoltaic unit has a capability of communicating with the inverter, and when each photovoltaic unit feeds back the first test signal characteristic information, all signal strengths can ensure that the inverter can receive the first test signal characteristic information. In this case, each photovoltaic unit sends the first test signal characteristic information to the inverter.

Manner 2

In the manner 2, the inverter receives the at least one first test signal characteristic information sent by at least one third photovoltaic unit, and all or some photovoltaic units in the at least one third photovoltaic unit are configured to forward first test signal characteristic information fed back by at least one fourth photovoltaic unit.

That is, in the manner 2, although each photovoltaic unit has a capability of communicating with the inverter, when the fourth photovoltaic unit sends the first test signal characteristic information, a signal strength cannot ensure that the inverter can receive the first test signal characteristic information. Consequently, a feedback result of the fourth photovoltaic unit (to be specific, the first test signal characteristic information fed back by the fourth photovoltaic unit) needs to be forwarded by the all or some photovoltaic units in the at least one third photovoltaic unit. That is, the fourth photovoltaic unit sends the first test signal characteristic information to the third photovoltaic unit, and the third photovoltaic unit reports the first test signal characteristic information to the inverter.

In addition, in the manner 2, during specific implementation, the feedback result may be forwarded by one third photovoltaic unit, or the feedback result may be forwarded by a plurality of third photovoltaic units. One or more third photovoltaic units forwarding a feedback result of one fourth photovoltaic unit or feedback results of several fourth photovoltaic units may be specifically determined based on a specific case. This is not limited in this embodiment of this application.

S303: The inverter performs absolute value or relative value sorting on the at least one piece of first test signal characteristic information, and determines a fault point in the photovoltaic system based on a sorting result.

In an embodiment, after receiving the first test signal characteristic information fed back by the at least one photovoltaic unit, the inverter may perform absolute value or relative value sorting on the first test signal characteristic information. In this case, in S303, that the inverter determines a fault point in the photovoltaic system based on a sorting result may be specifically implemented in the following manner: The inverter determines that an absolute value or a relative value of first test signal characteristic information fed back by a first photovoltaic unit is the smallest (for example, an absolute value or a relative value of signal strength information of the first test signal is the smallest), or the inverter determines that an absolute value or a relative value of first test signal characteristic information fed back by the first photovoltaic unit is the largest (for example, an absolute value or a relative value of impedance information of the first test signal is the largest); and the inverter determines that the fault point in the photovoltaic system is located between the first photovoltaic unit and a second photovoltaic unit, where the second photovoltaic unit is a photovoltaic unit adjacent to the first photovoltaic unit.

In the photovoltaic system, a ground distributed capacitance exists in a photovoltaic panel in the photovoltaic unit, and a ground distributed capacitance also exists between cables. If two photovoltaic units are disconnected, and a normal signal path is cut off, the first test signal flows back to a reference ground through the ground distributed capacitance in the photovoltaic panel and the ground distributed capacitance between the cables. Because a total ground distributed capacitance of a photovoltaic unit closest to a disconnection point is the smallest, an alternating current impedance of the photovoltaic unit is the largest, and a signal strength is the weakest.

For example, after determining that an absolute value or a relative value of a signal strength of the first test signal that is obtained by the first photovoltaic unit through measurement is the smallest, because there are two photovoltaic units adjacent to the first photovoltaic unit, one of the two photovoltaic units that has a disconnection fault with the first photovoltaic unit further needs to be determined. Usually, if the photovoltaic module controller measures the signal strength of the first test signal on a tail end of the photovoltaic unit, the inverter may determine that the disconnection fault occurs between a second photovoltaic unit connected to an output end of the first photovoltaic unit and the first photovoltaic unit; or if the photovoltaic module controller measures the signal strength on a front end of the photovoltaic unit, the inverter may determine that the disconnection fault occurs between a second photovoltaic unit connected to an input end of the first photovoltaic unit and the first photovoltaic unit.

This is because if a signal strength is measured on a tail end of each photovoltaic unit, for the photovoltaic unit before the disconnection point, there is no other photovoltaic unit but only one section of short cable after the tail end of the photovoltaic unit, a ground distributed capacitance formed at this section of cable is very small, and an alternating current impedance is very high. Consequently, the photovoltaic unit before the disconnection point should be a photovoltaic unit in which a signal strength obtained through measurement is the weakest in the at least one photovoltaic unit. Therefore, it may be determined that the disconnection fault occurs between the second photovoltaic unit connected to the output end of the first photovoltaic unit (the photovoltaic unit in which the signal strength obtained through measurement is the weakest) and the first photovoltaic unit. If a signal strength is measured on a front end of each photovoltaic unit, for the photovoltaic unit after the disconnection point, there is no other photovoltaic unit but only one section of short cable before the front end of the photovoltaic unit, a ground distributed capacitance formed at this section of cable is very small, and an alternating current impedance is very high. Consequently, the photovoltaic unit after the disconnection point should be a photovoltaic unit in which a signal strength obtained through measurement is the weakest in the at least one photovoltaic unit. Therefore, it may be determined that the disconnection fault occurs between the second photovoltaic unit connected to the input end of the first photovoltaic unit (the photovoltaic unit in which the signal strength obtained through measurement is the weakest) and the first photovoltaic unit.

Figure 4:
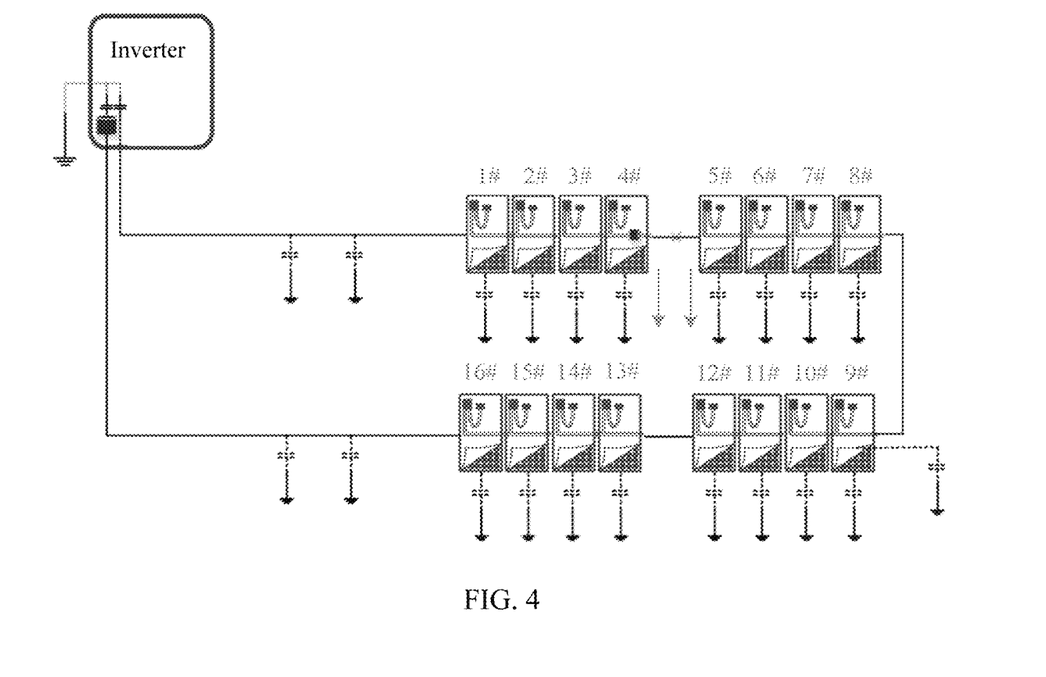
FIG. 4 is a schematic structural diagram of another photovoltaic system according to an embodiment of this application.

For example, as shown in FIG. 4, in a photovoltaic system, a disconnection fault occurs between a photovoltaic unit #4 and a photovoltaic unit #5, and a signal path is cut off between the photovoltaic unit #4 and the photovoltaic unit #5. A first test signal sent by an inverter further sequentially flows back to a reference ground through a ground distributed capacitance between cables, a ground distributed capacitance of a photovoltaic unit #1, a ground distributed capacitance of a photovoltaic unit #2, a ground distributed capacitance of a photovoltaic unit #3, and a ground distributed capacitance of a photovoltaic unit #4 while flowing through the inverter to the photovoltaic unit #1, and the photovoltaic unit #4. After the inverter sends the first test signal, a photovoltaic module controller in each photovoltaic unit measures a signal strength of the first test signal on a tail end of the photovoltaic unit. It is easily learned from FIG. 4 that because there is no other photovoltaic unit after the photovoltaic unit #4, a current flowing through the photovoltaic unit #4 is the smallest and a signal strength obtained through measurement in the photovoltaic unit #4 is the weakest. Similarly, on a path of the inverter →a photovoltaic unit #16 →a photovoltaic unit #15, . . . , and a photovoltaic unit #5, a current flowing through the photovoltaic unit #5 is the smallest and a signal strength obtained through measurement in the photovoltaic unit #5 is the weakest. In the example, the photovoltaic module controller in each photovoltaic unit tests a signal strength on a tail end of the photovoltaic unit, and the inverter may determine that a signal strength obtained through measurement in the photovoltaic unit #4 is the weakest and that a signal strength in the photovoltaic unit #3 and a signal strength in the photovoltaic unit #5 are also relatively weak. In this case, the inverter may determine that a disconnection fault occurs between the photovoltaic unit #4 and the photovoltaic unit #5 connected to an output end of the photovoltaic unit #4.

In the embodiments of this application, after the inverter performs S301 of sending a first test signal to the at least one photovoltaic unit, if the inverter determines that no first test signal characteristic information fed back by the at least one photovoltaic unit is obtained, the inverter may send a second test signal to the at least one photovoltaic unit, where a frequency of the second test signal is different from a frequency of the first test signal; the inverter obtains second test signal characteristic information fed back by the at least one photovoltaic unit; and the inverter performs absolute value or relative value sorting on the at least one piece of second test signal characteristic information, and determines the fault point in the photovoltaic system based on a sorting result.

That is, after the inverter sends the first test signal, if it is difficult for one or more photovoltaic units in the at least one photovoltaic unit to obtain first test signal characteristic information through measurement because of a relatively weak signal strength of the first test signal, or if all pieces of first test signal characteristic information obtained by a plurality of photovoltaic units through measurement are very close, and consequently, it is difficult for the inverter to distinguish between the first test signal characteristic information fed back by the photovoltaic units, the inverter may send a second test signal at another frequency, for the photovoltaic unit to measure a characteristic of the second test signal. Then, the inverter may determine the fault point in the photovoltaic unit based on absolute value or relative value sorting performed on the second test signal characteristic information.

For example, after the inverter sends a first test signal of 100 kHz, if the inverter receives no first test signal characteristic information fed back by the at least one photovoltaic unit, or if pieces of characteristic information obtained through measurement in some photovoltaic units are relatively close, and consequently, it is difficult for the inverter to distinguish between received first test signal characteristic information, the inverter may send a second test signal of 150 kHz, and determine the fault point in the photovoltaic system based on absolute value or relative value sorting performed on second test signal characteristic information.

In addition, before the foregoing method is performed to determine the fault point in the photovoltaic system, that a disconnection fault occurs in the photovoltaic system needs to be first determined, to further trigger to perform the foregoing method. In the embodiments of this application, that a disconnection fault occurs in the photovoltaic system may be determined in a plurality of manners, and three manners thereof are listed below.

Manner 1

In the manner 1, after the inverter determines that a current signal and/or a voltage signal of the at least one photovoltaic unit is abnormal, the inverter may determine that a disconnection fault occurs in the photovoltaic system. Further, the foregoing method in S301 to S303 is performed to determine a position in which the disconnection fault occurs.

For example, if an output current value of a photovoltaic unit becomes extremely small, it may be determined that a disconnection fault occurs in the photovoltaic system.

Manner 2

In the manner 2, after the inverter determines that an electric arc is generated in the photovoltaic system, the inverter may determine that a disconnection fault occurs in the photovoltaic system. Further, the foregoing method in S301 to S303 is performed to determine a position in which the disconnection fault occurs.

In an embodiment, an electric arc-fault circuit-interrupter (AFCI) may be disposed in the system. When an electric arc is generated in the photovoltaic system, the AFCI may identify the electric arc and cut off a power supply when the electric arc exists. The inverter may determine that the electric arc is generated in the system through the operation of cutting off the power supply performed by the AFCI, and further determine that a disconnection fault occurs in the photovoltaic system.

Manner 3

In the manner 3, the inverter may determine, based on the first test signal characteristic information fed back by the at least one photovoltaic unit, that a disconnection fault occurs in the photovoltaic system.

That is, to determine whether the disconnection fault occurs in the photovoltaic system, the inverter may send the first test signal, and determine, based on a result of absolute value or relative value sorting performed on the first test signal characteristic information fed back by the at least one photovoltaic unit, that the disconnection fault occurs in the photovoltaic system. After the disconnection fault occurs in the photovoltaic system, an absolute value or a relative value of characteristic information obtained through measurement in a photovoltaic unit closer to a disconnection point position is smaller (or larger). If the inverter determines that the first test signal characteristic information presents the foregoing tendency, it may be determined that the disconnection fault occurs in the photovoltaic system.

In addition, in the manner 3, the inverter may alternatively pre-store first test signal characteristic information received by each photovoltaic unit in a normal working state of the photovoltaic system, to be used as a reference basis for determining whether a disconnection fault occurs, and then compare the first test signal characteristic information received by the photovoltaic unit in the normal working state with first test signal characteristic information received by the photovoltaic unit at a current moment, to determine whether the disconnection fault occurs in the photovoltaic system.

It should be noted that in the embodiments of this application, the method shown in FIG. 3 may be alternatively performed by a specific photovoltaic unit in the photovoltaic system.

In this way, the fault point position determining method provided in the embodiments of this application is applied to a photovoltaic system. The photovoltaic system includes at least one photovoltaic unit, the photovoltaic unit includes at least one photovoltaic module and one photovoltaic module controller, and the method includes: sending, by a fifth photovoltaic unit in the at least one photovoltaic unit, a first test signal to at least one other photovoltaic unit in the at least one photovoltaic unit than the fifth photovoltaic unit; obtaining, by the fifth photovoltaic unit, first test signal characteristic information fed back by the at least one other photovoltaic unit; and performing, by the fifth photovoltaic unit, absolute value or relative value sorting on the at least one piece of first test signal characteristic information, and determining a fault point in the photovoltaic system based on a sorting result.

The first test signal characteristic information includes one or more of the following: signal strength information of the first test signal, and impedance information of the first test signal.

Correspondingly, in this implementation, the photovoltaic module controller receives the first test signal sent by the fifth photovoltaic unit in the at least one photovoltaic unit; the photovoltaic module controller measures the first test signal, to obtain the first test signal characteristic information; and the photovoltaic module controller feeds back the first test signal characteristic information to the fifth photovoltaic unit.

In the method shown in FIG. 3, the inverter sends the first test signal to the at least one photovoltaic unit, for the at least one photovoltaic unit to measure the first test signal. When the disconnection fault occurs in the photovoltaic system, the first test signal characteristic information fed back by the at least one photovoltaic unit presents a tendency different from that in a normal working state. Therefore, after obtaining the first test signal characteristic information fed back by the at least one photovoltaic unit, the inverter may determine the fault point in the photovoltaic system based on absolute value or relative value sorting performed on the first test signal characteristic information fed back by the at least one photovoltaic unit. According to the method shown in FIG. 3, when the disconnection fault occurs in the photovoltaic system, a fault point position can be correctly and efficiently determined without a manual check of the fault point position.

Figure 5:
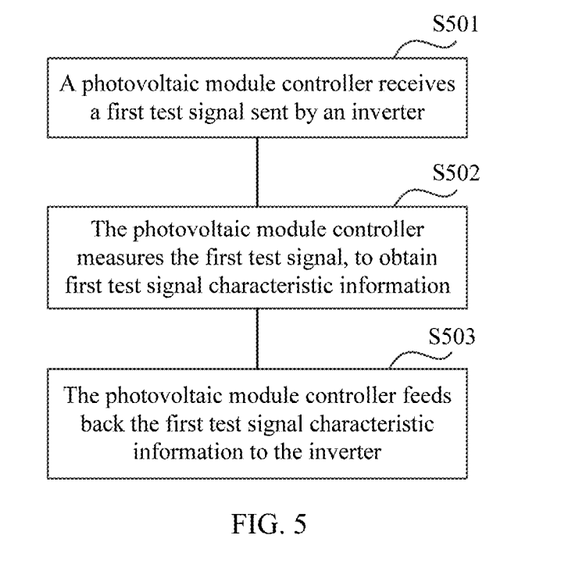
FIG. 5 is a schematic flowchart of another fault point position determining method according to an embodiment of this application.

Based on a same inventive concept, an embodiment of this application further provides a fault point position determining method. The method is applied to a photovoltaic system, the photovoltaic system includes at least one inverter and at least one photovoltaic unit, and the photovoltaic unit includes at least one photovoltaic module and a photovoltaic module controller. Referring to FIG. 5, the method includes the following operations.

S501: The photovoltaic module controller receives a first test signal sent by the inverter.

S502: The photovoltaic module controller measures the first test signal, to obtain first test signal characteristic information.

S503: The photovoltaic module controller feeds back the first test signal characteristic information to the inverter.

In addition, the photovoltaic module controller may be further configured to perform another operation performed by the photovoltaic unit in the method example provided in FIG. 3, and details are not described herein.

Figure 6:
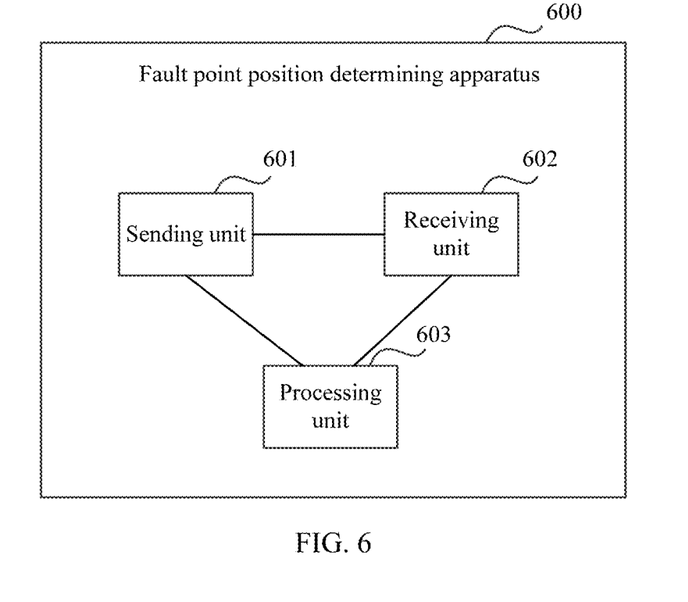
FIG. 6 is a schematic structural diagram of a first fault point position determining apparatus according to an embodiment of this application.

Based on a same inventive concept, an embodiment of this application further provides a fault point position determining apparatus. The apparatus is applied to a photovoltaic system, the photovoltaic system includes at least one fault point position determining apparatus and at least one photovoltaic unit, and the photovoltaic unit includes at least one photovoltaic module and one photovoltaic module controller. Referring to FIG. 6, a fault point position determining apparatus 600 includes:

a sending unit 601, configured to send a first test signal to the at least one photovoltaic unit;

a receiving unit 602, configured to obtain first test signal characteristic information fed back by the at least one photovoltaic unit; and a processing unit 603, configured to perform absolute value or relative value sorting on the at least one piece of first test signal characteristic information, and determine a fault point in the photovoltaic system based on a sorting result.

The photovoltaic module controller may be an optimizer or a shutdown device. The first test signal characteristic information may include one or more of the following: signal strength information of the first test signal, and impedance information of the first test signal.

Specifically, the first test signal may be a PLC communication signal.

In an embodiment, when determining the fault point in the photovoltaic system based on the sorting result, the processing unit 603 is specifically configured to: determine that an absolute value or a relative value of first test signal characteristic information fed back by a first photovoltaic unit is the smallest, or determine that an absolute value or a relative value of first test signal characteristic information fed back by the first photovoltaic unit is the largest; and determine that the fault point in the photovoltaic system is located between the first photovoltaic unit and a second photovoltaic unit, where the second photovoltaic unit is a photovoltaic unit adjacent to the first photovoltaic unit.

In an embodiment, when obtaining the first test signal characteristic information fed back by the at least one photovoltaic unit, the receiving unit 602 is specifically configured to: receive the at least one piece of first test signal characteristic information sent by the at least one photovoltaic unit; or receive the at least one piece of first test signal characteristic information sent by at least one third photovoltaic unit, where all or some photovoltaic units in the at least one third photovoltaic unit are configured to forward first test signal characteristic information fed back by at least one fourth photovoltaic unit.

In an embodiment, the processing unit 603 is further configured to: after the sending unit 601 sends the first test signal to the at least one photovoltaic unit, determine that no first test signal characteristic information fed back by the at least one photovoltaic unit is obtained; the sending unit 601 is further configured to send a second test signal to the at least one photovoltaic unit, where a frequency of the second test signal is different from a frequency of the first test signal; the receiving unit 602 is further configured to obtain second test signal characteristic information fed back by the at least one photovoltaic unit; and the processing unit 603 is further configured to: perform absolute value or relative value sorting on the at least one piece of second test signal characteristic information, and determine the fault point in the photovoltaic system based on a sorting result.

In a manner, the processing unit 603 is further configured to: before the sending unit 601 sends the first test signal to the at least one photovoltaic unit, determine that a current signal and/or a voltage signal of the at least one photovoltaic unit is abnormal; or determine that an electric arc is generated in the photovoltaic system.

In another processing manner, the processing unit 603 is further configured to: after the receiving unit 602 obtains the first test signal characteristic information fed back by the at least one photovoltaic unit, determine, based on the first test signal characteristic information fed back by the at least one photovoltaic unit, that a disconnection fault occurs in the photovoltaic system.

It should be noted that unit division in the embodiments of this application is an example and is merely logical function division, and during actual implementation, another division manner may be used. In addition, function units in the embodiments of this application may be integrated in one processor, or may physically exist alone, or two or more than two units may be integrated in one module. The foregoing integrated unit may be implemented in a form of hardware, or may be implemented in a form of a software function module.

When the integrated unit is implemented in a form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The software product is stored in a storage medium and includes several instructions for instructing a terminal device (which may be a personal computer, a mobile phone, a network device, or the like) or a processor to perform all or some of the steps of the methods in the embodiments of this application. The foregoing storage medium includes any medium that can store program code, such as a USB flash drive, a removable hard disk, a read-only memory (ROM), a random access memory (RAM), a magnetic disk, or an optical disc.

In the embodiments of this application, the inverter may be presented in a form of dividing the function modules in an integrated manner. The "module" herein may refer to a specific ASIC, a circuit, a processor and a memory for executing one or more of software or firmware programs, an integrated logic circuit, and/or another device that can provide the foregoing functions.

It should be noted that the fault point position determining apparatus 600 shown in FIG. 6 may be configured to perform the method shown in FIG. 3. For an implementation and a technical effect that are not described in detail in the apparatus 600 shown in FIG. 6, refer to related descriptions in the fault point position determining method shown in FIG. 3. Details are not described herein again.

Figure 7:
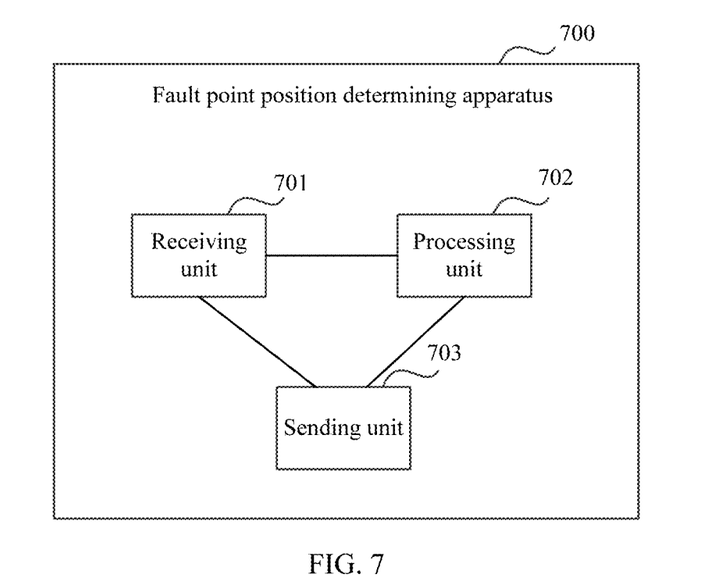
FIG. 7 is a schematic structural diagram of a second fault point position determining apparatus according to an embodiment of this application.

Based on a same inventive concept, an embodiment of this application provides a fault point position determining apparatus. The apparatus is applied to a photovoltaic system, the photovoltaic system includes at least one inverter and at least one photovoltaic unit, and the photovoltaic unit includes at least one photovoltaic module and at least one fault point position determining apparatus. Referring to FIG. 7, the fault point position determining apparatus 700 includes: a receiving unit 701, configured to receive a first test signal sent by the inverter; a processing unit 702, configured to measure the first test signal, to obtain first test signal characteristic information; and a sending unit 703, configured to feed back the first test signal characteristic information to the inverter.

It should be noted that the fault point position determining apparatus 700 shown in FIG. 7 may be configured to perform the method shown in FIG. 5. For an implementation and a technical effect that are not described in detail in the apparatus 700 shown in FIG. 7, refer to related descriptions in the fault point position determining method shown in FIG. 5. Details are not described herein again.

Figure 8:
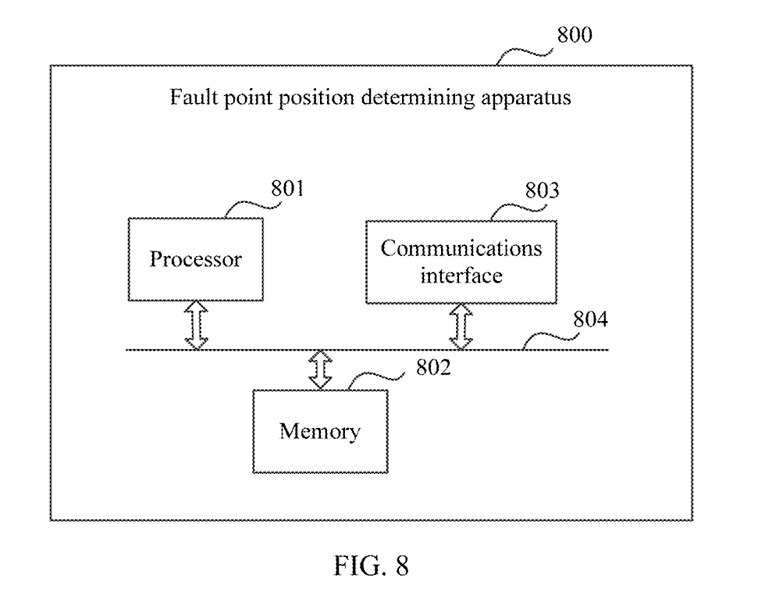
FIG. 8 is a schematic structural diagram of a third fault point position determining apparatus according to an embodiment of this application.

In an embodiment, a person skilled in the art may be aware that for the fault point position determining apparatus 600 shown in FIG. 6 or the fault point position determining apparatus 700 shown in FIG. 7, a form shown in FIG. 8 may be used.

A fault point position determining apparatus 800 shown in FIG. 8 includes at least one processor 801 and a memory 802, and optionally, may further include a communications interface 803.

The memory 802 may be a volatile memory such as a random access memory. The memory may alternatively be a non-volatile memory, for example, a read-only memory, a flash memory, a hard disk drive (HDD), or a solid-state drive (SSD). Alternatively, the memory 802 is any other medium that is accessible by a computer and that can be used to carry or store desired program code in an instruction or data structure form, but is not limited thereto. The memory 802 may be a combination of the foregoing memories.

In an embodiment of this application, a specific connection medium between the processor 801 and the memory 802 is not limited. In this embodiment of this application, the memory 802 and the processor 801 are connected by using a bus 804 in the figure, the bus 804 is represented by a thick line in the figure, and a connection manner of other components is merely used for schematic description and is not limited thereto. The bus 804 may be classified into an address bus, a data bus, a control bus, and the like. For ease of representation, only one thick line is used to represent the bus in FIG. 8, but this does not mean that there is only one bus or only one type of bus.

The processor 801 may have a data receiving and sending function, and can communicate with another device (for example, a photovoltaic unit or an inverter). In the apparatus in FIG. 8, an independent data receiving and sending module, such as the communications interface 803, may be alternatively disposed, and configured to receive and send data. When communicating with another device (for example, a photovoltaic unit or an inverter), the processor 801 may transmit data through the communications interface 803.

When the inverter uses the form shown in FIG. 8, the processor 801 in FIG. 8 may invoke a computer-executable instruction stored in the memory 802, so that the inverter can perform the method provided in any one of the foregoing method embodiments.

In an embodiment, all of functions/implementation processes of the sending unit, the receiving unit, and the processing unit in FIG. 6 may be implemented by the processor 801 in FIG. 8 by invoking the computer-executable instruction stored in the memory 802. Alternatively, a function/an implementation process of the processing unit in FIG. 6 may be implemented by the processor 801 in FIG. 8 by invoking the computer-executable instruction stored in the memory 802, and functions/implementation processes of the sending unit and the receiving unit in FIG. 6 may be implemented by the communications interface 803 in FIG. 8.

In an embodiment, all of functions/implementation processes of the sending unit, the receiving unit, and the processing unit in FIG. 7 may be implemented by the processor 801 in FIG. 8 by invoking the computer-executable instruction stored in the memory 802. Alternatively, a function/an implementation process of the processing unit in FIG. 7 may be implemented by the processor 801 in FIG. 8 by invoking the computer-executable instruction stored in the memory 802, and functions/implementation processes of the sending unit and the receiving unit in FIG. 7 may be implemented by the communications interface 803 in FIG. 8.

It should be noted that the fault point position determining apparatus 800 shown in FIG. 8 may be configured to perform the method shown in FIG. 3, or may be considered as a device the same as the fault point position determining apparatus 600 shown in FIG. 6. For an implementation and a technical effect that are not described in detail in the apparatus 800 shown in FIG. 8, refer to related descriptions in the fault point position determining method shown in FIG. 3. Details are not described herein again. The fault point position determining apparatus 800 shown in FIG. 8 may alternatively be configured to perform the method shown in FIG. 5, or may be considered as a device the same as the fault point position determining apparatus 700 shown in FIG. 7. For an implementation and a technical effect that are not described in detail in the apparatus 800 shown in FIG. 8, refer to related descriptions in the fault point position determining method shown in FIG. 5. Details are not described herein again.

Figure 9:
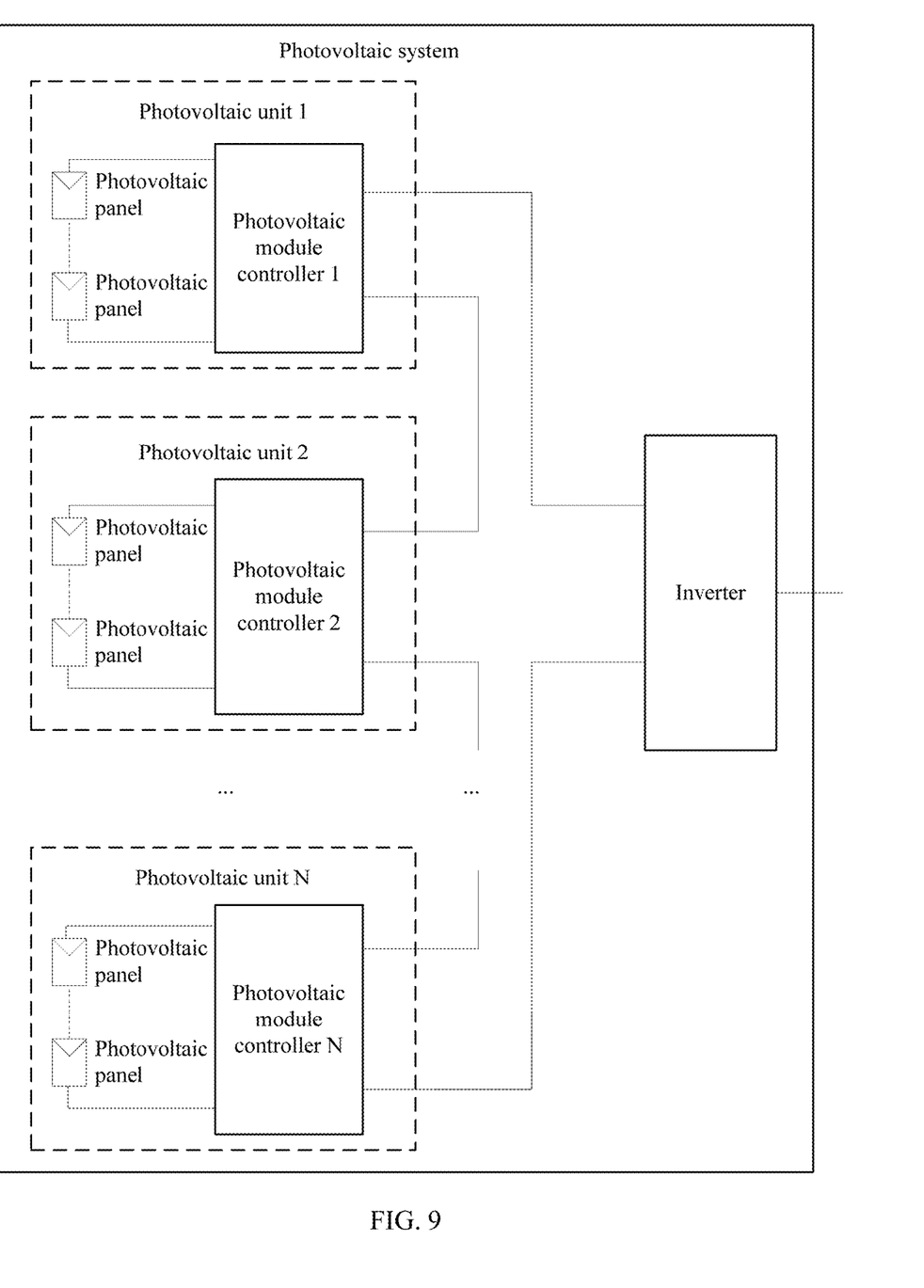
FIG. 9 is a schematic structural diagram of a third photovoltaic system according to an embodiment of this application.

Based on a same inventive concept, an embodiment of this application further provides a photovoltaic system. Referring to FIG. 9, the photovoltaic system includes at least one inverter (one inverter is used as an example in FIG. 9 for illustration) and at least one photovoltaic unit, and the photovoltaic unit includes at least one photovoltaic module and one photovoltaic module controller. The inverter is configured to send a first test signal to the at least one photovoltaic unit; the photovoltaic unit is configured to feed back first test signal characteristic information to the inverter, and the inverter is further configured to perform absolute value or relative value sorting on the at least one piece of first test signal characteristic information, and determine a fault point in the photovoltaic system based on a sorting result.

In addition, in the photovoltaic system shown in FIG. 9, the inverter may be further configured to perform another operation performed by the inverter in the fault point position determining method shown in FIG. 3, the photovoltaic unit may be further configured to perform another operation performed by the photovoltaic module controller in the fault point position determining method shown in FIG. 5, and details are not described herein again.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

A person skilled in the art can make various modifications and variations to this application without departing from the scope of this application. This application is intended to cover these modifications and variations of this application provided that they fall within the scope of the claims in this application and their equivalent technologies.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

What is claimed is:

1. A method for determining a fault point position, comprising:
    sending, by an inverter of a photovoltaic system comprising a plurality of photovoltaic units, a second test signal to at least one photovoltaic unit of the plurality of photovoltaic units on an electrical path between the inverter and the at least one photovoltaic unit, wherein the plurality of photovoltaic units are electrically interconnected using a plurality of series connections and a plurality of parallel connections;
    determining, by the inverter, that the inverter obtains no second test signal characteristic information communicated from the at least one photovoltaic unit on the electrical path between the inverter and the at least one photovoltaic unit in response to the second test signal;
    sending, by the inverter responsive to determining that the inverter obtains no second test signal characteristic information, a first test signal to the at least one photovoltaic unit on the electrical path between the inverter and the at least one photovoltaic unit, wherein a frequency of the second test signal is different from a frequency of the first test signal;
    obtaining, by the inverter, first test signal characteristic information communicated from the at least one photovoltaic unit on the electrical path between the inverter and the at least one photovoltaic unit in response to the first test signal;
    performing, by the inverter, absolute value or relative value sorting on the first test signal characteristic information;
    determining, based on a sorting result, a location of a fault point in the photovoltaic system between a first photovoltaic unit of the plurality of photovoltaic units and a second photovoltaic unit of the plurality of photovoltaic units, wherein the first photovoltaic unit and the second photovoltaic unit are electrically connected to one another in series; and
    responsive to determining the location of the fault point in the photovoltaic system, disabling an output of one or more of the plurality of photovoltaic units.

2. The method of claim 1, wherein the first test signal characteristic information comprises one or more of the following:
    signal strength information of the first test signal; or
    impedance information of the first test signal.

3. The method of claim 1, wherein determining the fault point in the photovoltaic system based on the sorting result comprises:
    determining, by the inverter, that an absolute value or a relative value of the first test signal characteristic information communicated from the first photovoltaic unit is smallest or largest, wherein the second photovoltaic unit is adjacent to the first photovoltaic unit.

4. The method of claim 1, wherein obtaining the first test signal characteristic information communicated from the at least one photovoltaic unit comprises:
    receiving, by the inverter, the first test signal characteristic information sent by a third photovoltaic unit, wherein the third photovoltaic unit is configured to forward the first test signal characteristic information communicated from a fourth photovoltaic unit.

5. The method of claim 1, wherein after obtaining the first test signal characteristic information communicated from the at least one photovoltaic unit, the method further comprises:
    determining, by the inverter based on the first test signal characteristic information communicated from the at least one photovoltaic unit, that a disconnection fault occurs in the photovoltaic system.

6. A method for determining a fault point position, comprising:
    sending, by a first photovoltaic unit of a plurality of photovoltaic units of a photovoltaic system, a second test signal to a second photovoltaic unit of the plurality of photovoltaic units on an electrical path between the first photovoltaic unit and the second photovoltaic unit, wherein the plurality of photovoltaic units are electrically interconnected using a plurality of series connections and a plurality of parallel connections;
    determining, by the first photovoltaic unit, that the first photovoltaic unit obtains no second test signal characteristic information communicated from the second photovoltaic unit on the electrical path between the first photovoltaic unit and the second photovoltaic unit in response to the second test signal;

sending, by the first photovoltaic unit responsive to determining that the first photovoltaic unit obtains no second test signal characteristic information, a first test signal to the second photovoltaic unit on the electrical path between the first photovoltaic unit and the second photovoltaic unit, wherein a frequency of the second test signal is different from a frequency of the first test signal;

obtaining, by the first photovoltaic unit, first test signal characteristic information communicated from the second photovoltaic unit;

performing, by the first photovoltaic unit, absolute value or relative value sorting on the first test signal characteristic information;

determining, based on a sorting result, a location of a fault point in the photovoltaic system between the first photovoltaic unit of the plurality of photovoltaic units and the second photovoltaic unit of the plurality of photovoltaic units, wherein the first photovoltaic unit and the second photovoltaic unit are electrically connected to one another in series; and responsive to determining the location of the fault point in the photovoltaic system, disabling an output of one or more of the plurality of photovoltaic units.

7. The method of claim 6, wherein the first test signal characteristic information comprises one or more of the following:
signal strength information of the first test signal; or
impedance information of the first test signal.

8. An apparatus for determining a fault point position, comprising:
a transmitter to send a second test signal to at least one photovoltaic unit of a photovoltaic system comprising a plurality of photovoltaic units that are electrically interconnected using a plurality of series connections and a plurality of parallel connections, and send a first test signal to the at least one photovoltaic unit responsive to determining that no second test signal characteristic information is obtained, wherein a frequency of the second test signal is different from a frequency of the first test signal, and wherein the first test signal and the second test signal are transmitted on an electrical path between the transmitter and the at least one photovoltaic unit;

a receiver, configured to obtain first test signal characteristic information communicated from the at least one photovoltaic unit, and obtain second test signal characteristic information communicated from the at least one photovoltaic unit, wherein the first test signal characteristic information is received on the electrical path between the receiver and the at least one photovoltaic unit; and a processor to determine that no second test signal characteristic information communicated from the at least one photovoltaic unit is obtained, perform absolute value or relative value sorting on the first test signal characteristic information, determine, based on a sorting result, a location of a fault point in the photovoltaic system between a first photovoltaic unit of the plurality of photovoltaic units and a second photovoltaic unit of the plurality of photovoltaic units, and, responsive to determining the location of the fault point in the photovoltaic system, disable an output of one or more of the plurality of photovoltaic units, wherein the first photovoltaic unit and the second photovoltaic unit are electrically connected to one another in series.

9. The apparatus of claim 8, wherein the first test signal characteristic information comprises one or more of the following:
signal strength information of the first test signal; or
impedance information of the first test signal.

10. The apparatus of claim 8, wherein when determining the fault point in the photovoltaic system based on the sorting result, the processor is configured to:
determine that an absolute value or a relative value of first test signal characteristic information communicated from the first photovoltaic unit is smallest or largest, wherein the second photovoltaic unit is adjacent to the first photovoltaic unit.

11. The apparatus of claim 8, wherein when obtaining the first test signal characteristic information communicated from the at least one photovoltaic unit, the receiver is configured to:
receive the first test signal characteristic information sent by a third photovoltaic unit, wherein the third photovoltaic unit is configured to forward the first test signal characteristic information communicated from a fourth photovoltaic unit.

12. The apparatus of claim 8, wherein the processor is further configured to:
after the receiver obtains the first test signal characteristic information communicated from the at least one photovoltaic unit, determine, based on the first test signal characteristic information communicated from the at least one photovoltaic unit, that a disconnection fault occurs in the photovoltaic system.

13. A photovoltaic system, comprising:
a plurality of photovoltaic units that are electrically interconnected using a plurality of series connections and a plurality of parallel connections; and an inverter to send a second test signal to at least one photovoltaic unit of the plurality of photovoltaic units on an electrical path between the inverter and the at least one photovoltaic unit, and send a first test signal to the at least one photovoltaic unit on the electrical path between the inverter and the at least one photovoltaic unit responsive to determining that no second test signal characteristic information is obtained, wherein a frequency of the second test signal is different from a frequency of the first test signal, wherein the at least one photovoltaic unit is configured to communicate first test signal characteristic information to the inverter on the electrical path between the inverter and the at least one photovoltaic unit, and communicate second test signal characteristic information to the inverter on the electrical path between the inverter and the at least one photovoltaic unit, and wherein the inverter is further configured to determine that no second test signal characteristic information communicated from the at least one photovoltaic unit is obtained, perform absolute value or relative value sorting on the first test signal characteristic information, determine, based on a sorting result, a location of a fault point in the photovoltaic system between a first photovoltaic unit of the plurality of photovoltaic units and a second photovoltaic unit of the plurality of photovoltaic units, and, responsive to determining the location of the fault point in the photovoltaic system, disable an output of one or more of the plurality of photovoltaic units, wherein the first photovoltaic unit and the second photovoltaic unit are electrically connected to one another in series.

14. The method of claim 1, wherein the first test signal is sent using a power line communication (PLC) protocol.

15. The method of claim 6, wherein the first test signal is sent using a power line communication (PLC) protocol.

16. The method of claim 6, further comprising measuring, by the second photovoltaic unit, a strength of the first test signal to generate the first test signal characteristic information.

17. The apparatus of claim 8, wherein the first test signal is sent using a power line communication (PLC) protocol.

18. The photovoltaic system of claim 13, wherein the first test signal is sent using a power line communication (PLC) protocol.

19. The photovoltaic system of claim 13, wherein the at least one photovoltaic unit is further configured to measure a strength of the first test signal to generate the first test signal characteristic information.

\* \* \* \* \*